: US 10,866,924 B2
(45) Date of Patent: Dec. 15, 2020

(12) United States Patent
Han et al.

(54) DEVICE FOR VECTOR DATA RETURNING PROCESSING UNIT IN FRACTAL TREE, METHOD, CONTROL DEVICE, AND INTELLIGENT CHIP

(71) Applicant: Institute of Computing Technology, Chinese Academy of Sciences, Beijing (CN)

(72) Inventors: Dong Han, Beijing (CN); Tao Luo, Beijing (CN); Shaoli Liu, Beijing (CN); Shijin Zhang, Beijing (CN); Yunji Chen, Beijing (CN)

(73) Assignee: Institute of Computing Technology, Chinese Academy of Sciences, Beijing (CN)

( * ) Notice: Subject to any disclaimer, the term of this patent is extended or adjusted under 35 U.S.C. 154(b) by 338 days.

(21) Appl. No.: 15/781,039

(22) PCT Filed: Jun. 17, 2016

(86) PCT No.: PCT/CN2016/086094
§ 371 (c)(1),
(2) Date: Jun. 1, 2018

(87) PCT Pub. No.: WO2017/107411
PCT Pub. Date: Jun. 29, 2017

(65) Prior Publication Data
US 2020/0272595 A1     Aug. 27, 2020

(30) Foreign Application Priority Data
Dec. 24, 2015   (CN) .......................... 2015 1 0983391

(51) Int. Cl.
G06F 15/78       (2006.01)
G06F 16/901      (2019.01)
G06F 17/16       (2006.01)

(52) U.S. Cl.
CPC ...... G06F 15/7825 (2013.01); G06F 16/9027 (2019.01); G06F 17/16 (2013.01)

(58) Field of Classification Search
CPC .. G06F 16/9027; G06F 17/16; G06F 16/2246; G06F 30/00
See application file for complete search history.

(56) References Cited

U.S. PATENT DOCUMENTS 6,334,125 B1   12/2001   Johnson et al.
8,886,677 B1   11/2014   Depelteau et al.
(Continued)

FOREIGN PATENT DOCUMENTS

CN         105630733 A       6/2016

OTHER PUBLICATIONS

International Search Report dated Sep. 30, 2016, in related PCT Application No. PCT/CN2016/086094, 4 pgs.

*Primary Examiner* — Deepa Belur
(74) *Attorney, Agent, or Firm* — Maschoff Brennan

(57) ABSTRACT

An example device comprises a central node for receiving vector data returned by leaf nodes, a plurality of leaf nodes for calculating and shifting the vector data, and forwarder modules comprising a local cache structure and a data processing component, wherein the plurality of leaf nodes are divided into N groups, each group having the same number of leaf nodes; the central node is individually in communication connection with each group of leaf nodes by means of the forwarder modules; a communication structure constituted by each group of leaf nodes has self-similarity; the plurality of leaf nodes are in communication connection with the central node in a complete M-way tree approach by means of the forwarder modules of multiple levels; each of the leaf nodes comprises a setting bit.

14 Claims, 8 Drawing Sheets

(56) References Cited

U.S. PATENT DOCUMENTS

| | | | |
|---|---|---|---|
| 2007/0217500 A1* | 9/2007 | Gao | H04N 19/176 375/240.01 |
| 2007/0253642 A1* | 11/2007 | Berrill | G06F 16/9027 382/305 |
| 2015/0120750 A1* | 4/2015 | Hefeeda | G06F 16/70 707/741 |
| 2016/0189058 A1* | 6/2016 | Ozkan | G06N 5/00 706/12 |
| 2018/0089243 A1* | 3/2018 | Warren, Jr. | G06F 16/235 |
| 2018/0314722 A1* | 11/2018 | Li | G06F 16/2455 |
| 2018/0321911 A1* | 11/2018 | Li | G06F 7/501 |
| 2019/0377580 A1* | 12/2019 | Vorbach | G06F 1/32 |

\* cited by examiner

DEVICE FOR VECTOR DATA RETURNING PROCESSING UNIT IN FRACTAL TREE, METHOD, CONTROL DEVICE, AND INTELLIGENT CHIP

FIELD OF THE INVENTION

The present disclosure relates to the technical fields of intelligent device, unmanned driving and network-on-chip data transmission, etc., and particularly relates to a device for a vector data returning processing unit in a fractal tree, a method, a control device, and an intelligent chip.

BACKGROUND ART

The fractal tree structure is a multi-level tree structure consisting of one root node as a central node and a plurality of groups of leaf nodes having self-similarity. The fractal tree has been widely used in a very large scale integration (VLSI) design, because a layout of a complete M-way tree is used, and as use area of such layout is in direct proportion to the number of tree nodes, a space on chip can be saved. Moreover, a delay of propagation in the fractal tree is the same, so it is often used as an interconnection network in a VLSI multiprocessor.

A vector in the linear algebra refers to an ordered array consisting of n real numbers or complex numbers, which is called as a n-dimensional vector, and $\alpha=(a_1,a_2,\Lambda a_i,a_n)$ is the n-dimensional vector, wherein $a_i$ is the ith component of the vector $\alpha$.

In the process of returning a plurality of components of a vector which are scattered in respective leaf nodes of a fractal tree to the root node of the fractal tree, component data competes with each other to transmit in the intermediate nodes of the fractal tree, and maintaining transmission of the component data requires a protocol for ensuring reliability of the component data. Because it can not be informed among the respective leaf nodes when the component data is returned, when the component data is transmitted to the root node, the component data is out of order, and hence it is required to establish a set of complex mechanism for the root node and the leaf nodes to maintain an order among respective component data, such that the component data is finally spliced to a vector data sequentially.

There is not an effective and convenient support to the transmission of the vector data in a fractal tree structure based on network-on-chip in the prior art, so it is urgent and necessary to provide a non-conflicting, reliable and sequential way of transmitting the vector data in a fractal tree structure based on network-on-chip.

SUMMARY

With respect to deficiencies of the prior art, the present disclosure provides a device for a vector data returning processing unit in a fractal tree, a method, a control device, and an intelligent chip.

The present disclosure provides a device for a vector data returning processing unit in a fractal tree, comprising:

a central node that is as a communication data center of a network-on-chip and for receiving the vector data returned by a plurality of leaf nodes;

a plurality of leaf nodes for calculating and shifting the vector data; and forwarder modules comprising a local cache structure and a data processing component, and configured to perform data communication between nodes of upper and lower levels and process the vector data, wherein the plurality of leaf nodes are divided into N groups, each group having the same number of leaf nodes, the central node is individually in communication connection with each group of leaf nodes by means of the forwarder modules, a communication structure constituted by each group of leaf nodes has self-similarity, the plurality of leaf nodes are in communication connection with the central node in a complete M-way tree approach by means of the forwarder modules of multiple levels, each of the leaf nodes comprises a setting bit, if the setting bit requires that the vector data in the leaf node be shifted, the leaf node shifts the vector data of preset bandwidth bits to a corresponding position, and otherwise, the leaf node returns the vector data to the central node.

As regards to the device for a vector data returning processing unit in a fractal tree, each of the leaf nodes has an id identifier which sequentially increases in sequence numbers from one side of a topology of the complete M-way tree according to an order; the device for a vector data returning processing unit in a fractal tree shares a clock signal.

As regards to the device for a vector data returning processing unit in a fractal tree, each of the forwarder modules comprises adders of preset bandwidth, the number of the adders is a total number of the leaf nodes, and the adders have overflow detection function, wherein if the vector data is shifted, the forwarder modules splice the received vector data, and transmit spliced results to nodes of the upper level, and otherwise, the forwarder modules transmit the received vector data to the nodes of the upper level after detecting overflow and performing an add operation.

The present disclosure further provides a method of using the device, the method comprising:

calculating and shifting vector data by means of the leaf nodes, and returning to the central node, wherein each leaf node comprises a setting bit, if the setting bit requires that the vector data in the leaf node be shifted, the leaf node shifts the vector data of preset bandwidth bits to a corresponding position, and otherwise, the leaf node returns the vector data to the central node.

As regards to the method, each of the leaf nodes has an id identifier which sequentially increases in sequence numbers from one side of a topology of the complete M-way tree according to an order; the device for a vector data returning processing unit in a fractal tree shares a clock signal.

As regards to the method, if data transmitted by a leaf node is vector data of valid preset bandwidth, the setting bit requires that the leaf node to perform shifting, the leaf node performs a calculation according to the id identifier and the bit number of preset bandwidth, so as to shift the vector in the leaf node to a corresponding position on full bandwidth.

As regards to the method, if the vector data is shifted, the forwarder modules splice the received vector data, and transmit spliced results to nodes of an upper level, and otherwise, the forwarder modules transmit the received vector data to the nodes of the upper level after detecting overflow and performing an add operation.

As regards to the method, a Handshake Protocol is abided between the leaf nodes and the central node.

The present disclosure further provides a control device comprising the device. The present disclosure further provides an intelligent chip comprising the control device.

DETAILED DESCRIPTION

Figure 1:
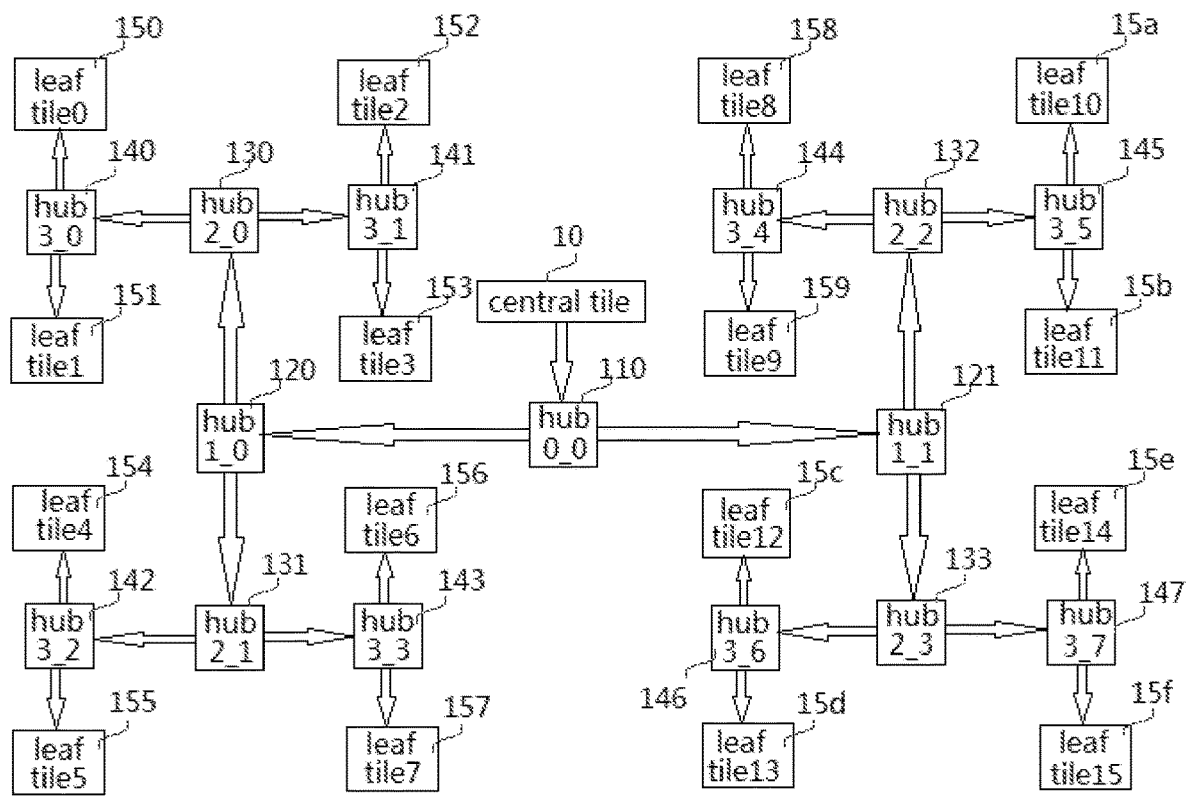
FIG. 1 is a schematic structure diagram of a multicore on chip of 16+1 cores connected using a H-tree in one embodiment of the present disclosure.

The present disclosure provides a device for a vector data returning processing unit in a fractal tree, comprising:

a central node that is as a communication data center of the network-on-chip and for receiving the vector data returned by a plurality of leaf nodes;

a plurality of leaf nodes for calculating and shifting the vector data; and forwarder modules comprising a local cache structure and a data processing component and configured to perform data communication between nodes of upper and lower levels and process the vector data, the forward modules comprising leaf forwarder modules in directly connection with the leaf nodes, a central forwarder module in directly connection with the central node, and intermediate forwarder modules in indirectly connection with the leaf nodes and the central node;

wherein the plurality of leaf nodes are divided into N groups, each group having the same number of leaf nodes, the central node is individually in communication connection with each group of leaf nodes by means of the forwarder modules, a communication structure constituted by each group of leaf nodes has self-similarity, the plurality of leaf nodes are in communication connection with the central node in a complete M-way tree approach by means of the forwarder modules of multiple levels, each leaf node comprises a setting bit, if the setting bit requires that the vector data in the leaf nodes be shifted, the leaf node shifts the vector data of preset bandwidth bits to a corresponding position, and otherwise, the leaf node returns the vector data to the central node.

Each of the leaf nodes has an id identifier which sequentially increases in sequence numbers from one side of a topology of the complete M-way tree according to an order; and the device for a vector data returning processing unit in a fractal tree shares a clock signal.

Each of the forwarder modules comprises adders of preset bandwidth, the number of the adders is a total number of the leaf nodes, and the adders have overflow detection function, wherein if the vector data is shifted, the forwarder modules splice the received vector data, and transmit spliced results to nodes of the upper level, and otherwise, the forwarder modules transmit the received vector data to the nodes of the upper level after detecting overflow and performing an add operation.

The present disclosure further provides a method of using the device, the method comprising:

calculating and shifting vector data by means of the leaf nodes, and returning to the central node, wherein each leaf node comprises a setting bit, if the setting bit requires that the vector data in the leaf node be shifted, the leaf node shifts the vector data of preset bandwidth bits to a corresponding position, and otherwise, the leaf node returns the vector data to the central node.

Each of the leaf nodes has an id identifier which sequentially increases in sequence numbers from one side of a topology of the complete M-way tree according to an order; the device for a vector data returning processing unit in a fractal tree shares a clock signal.

If data transmitted by a leaf node is valid vector data of preset bandwidth, the setting bit requires that the leaf node to perform shifting, the leaf node performs calculation based on the id identifier and the bit number of preset bandwidth, and the vector data in the leaf node is shifted to a corresponding position on full bandwidth.

If the vector data has been shifted, the forwarder modules splice the received vector data, and transmit spliced results to nodes of an upper level, and otherwise, the forwarder modules transmit the received vector data to the nodes of the upper level after detecting overflow and performing an add operation.

A Handshake Protocol is abided between the leaf nodes and the central node, i.e., after preparing to transmit data, data senders of two nodes of the lower level transmit a data valid signal, and place the data on a bus; after preparing to receive data, data receivers of nodes of the upper level transmit a data ready-to-receive signal; only if the data valid signal and the data ready-to-receive signal are detected, the data on the bus are received by the data receiver.

The intermediate forwarder modules splice and transmit the vector data in data caches, and comprise: firstly, splicing all received vector data transmitted from the nodes of the lower level through adders, and then inputting vector data results into the nodes of the upper level.

When vector data is returned to an add tree between the plurality of leaf nodes and the central node from the plurality of leaf nodes, if effective data transmitted by the leaf nodes is vector data of full bandwidth, a transmission way of the vector data transmitted from the plurality of leaf nodes on hubs is as follows: firstly, inputting into data caches of the leaf forwarder modules in directly connection with the leaf nodes to add and cache, then sequentially adding and transmitting in data caches of the intermediate forwarder modules, and finally inputting into a data cache of the central forwarder module in directly connection with the central node to add, and hence outputting the added results to the central node via output ports.

The intermediate forwarder modules add and transmit the vector data in data caches, and comprises: firstly, adding all received vector data transmitted from the nodes of the lower level through adders, and then inputting vector data results into the nodes of the upper level.

The present disclosure further provides a control device comprising the data publication device.

The present disclosure further provides an intelligent chip comprising the control device.

Below are two embodiments of the present disclosure, and the present disclosure is further explained in detail with reference to the drawings, such that those skilled in the art can carry it out according to the disclosure.

One embodiment is a specific configuration of the vector data return processing unit in a H-tree network structure.

FIG. 1 illustrates a schematic diagram of a communication device for processing and returning vector data elements on chip of 16+1 processing units connected using the H-tree network structure. A root node of the H-tree is a central tile, which is an endpoint of vector data transmission; leaf nodes of the H-tree are leaf tiles, which are start points of the vector data transmission; the remaining intermediate nodes are hubs for processing and transmitting the vector data. A communication method of processing data elements by returning vector results in the H-tree is adopted in the device.

Figure 2:
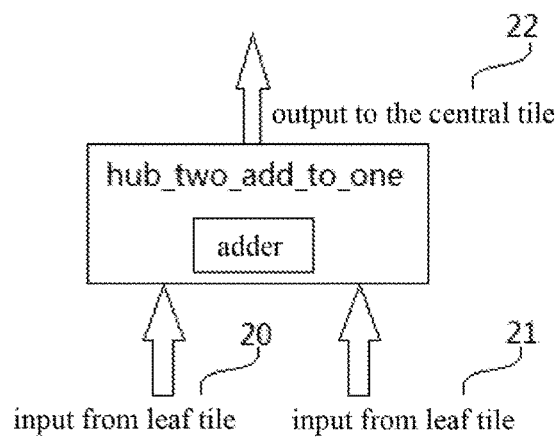
FIG. 2 is a schematic structure diagram of hub_two_add_to_one in one embodiment of the present disclosure.

FIG. 2 illustrates a schematic structure diagram of a hub in the H-tree network structure, the hub is consisted of a hub_two_add_to_one module which comprises an adder, the hub_two_add_to_one processes two groups of input vector data 20 and 21 of full bandwidth to one group of vector data 22 of full bandwidth to output and transmit from the leaf tiles to the central tile.

As shown in FIG. 1, when the central tile labeled as 10 collects the vector data whose effective bandwidth is a preset bandwidth and which is transmitted from respective leaf tiles, a transmission way of the vector data on the hubs is as follows: firstly, each group of leaf tiles: a leaf tile0 labeled as 150 and a leaf tile1 labeled as 151, 152 and 153, 154 and 155, 156 and 157, 158 and 159, 15a and 15b, 15c and 15d, 15e and 15f perform Handshake Protocols respectively with the corresponding leaf hubs: a hub3_0 labeled as 140, 141, 142, 143, 144, 145, 146 and 147 of the upper level in directly connection with the leaves, and after the Handshakes are successful, the vector data are input into data caches of the leaf hubs, and spliced; when the leaf hubs: the hub3_0 labeled as 140, 141, 142, 143, 144, 145, 146 and 147 successful perform handshake with the intermediate hubs: a hub2_0 labeled as 130, 131, 132 and 133 of the upper level respectively, the vector data are input into data caches of the intermediate hubs, and spliced; similarly, when the intermediate hubs: the hub2_0 labeled as 130, 131, 132 and 133 successfully perform handshake with the hubs: a hub1_0 labeled as 120 and 121 of the upper level respectively, the vector data are input into data caches of 120 and 121, and spliced; finally, based on the Handshake Protocols, 120 and 121 input the vector data into a data cache of a central hub0_0 in directly connection with the central tile for splicing, and a final spliced result is output to the central tile 10 via output ports. Returning of the spliced vector data can be achieved on the network structure by means of this method.

Figure 3:
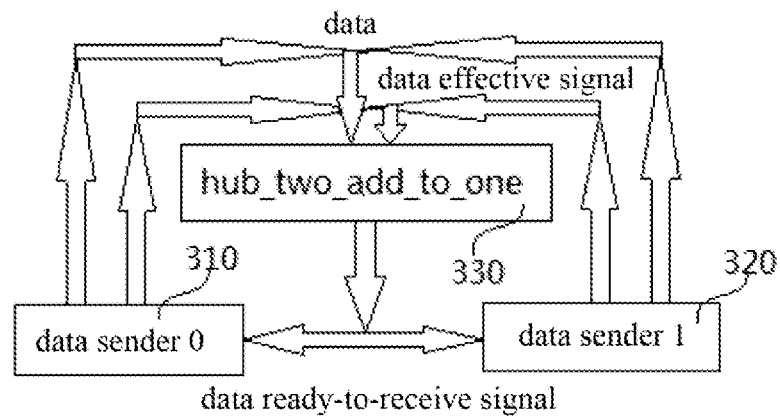
FIG. 3 is a schematic diagram of an action of handshake between the hub_two_add_to_one and the data senders in one embodiment of the present disclosure.

As shown in FIG. 3, when the hub_two_add_to_one module labeled as 330 has transmitted the data ready-to-receive signal to the bus, and the data sender 0 labeled as 310 and the data sender 1 labeled as 320 have transmitted the data and the data valid signal to the bus, the Handshake Protocol is successful, 310 and 320 consider that the data receiver 330 has received the data on this cycle, and 330 stores the data on the bus on this cycle into its buffer region on the next cycle. The data transmission protocol ensures data reliability in point-to-point data transmission, thereby ensuring reliability of data transmission of the network-on-chip.

Figure 5:
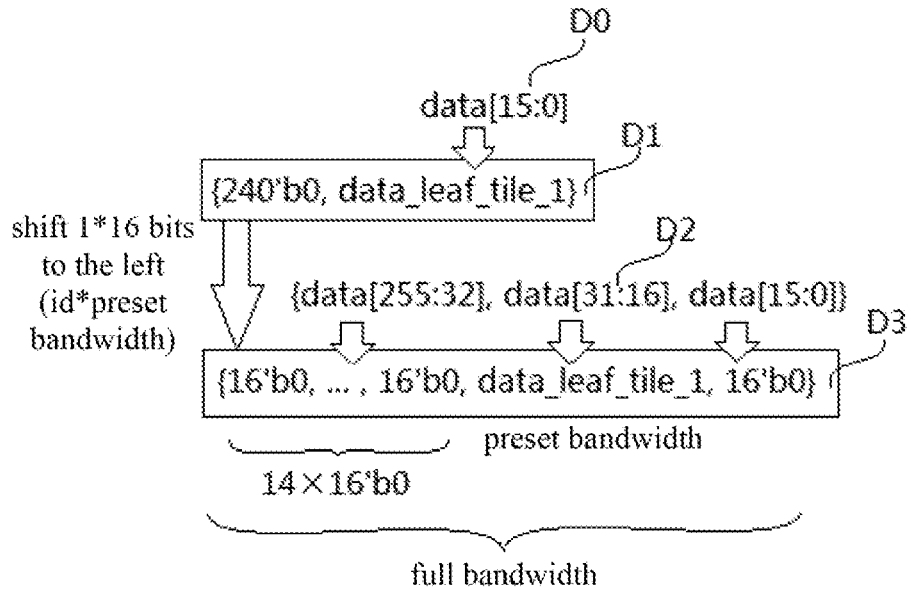
FIG. 5 is a schematic diagram of an action of shifting a component data to a vector data in a leaf tile in one embodiment of the present disclosure.

In the process of returning the spliced vector data, effective data bits transmitted by the leaf tiles are vector data of preset bandwidth, and before the leaf tiles transmit the vector data, the setting bits are selected to shift the component data owned by the leaf tiles. When selecting to shift the vector data, the leaf tiles calculate bits to be shifted according to the unique id number and the bit number of preset bandwidth, and shift the component data of preset bandwidth bits owned by the leaf tiles to the corresponding positions on the vector data of full bandwidth. As shown in FIG. 5, it is a specific example implemented on the H-tree of FIG. 1, supposing the full bandwidth is 251 bits, and can be spliced by 16-bit component data owned by sixteen leaf tiles. FIG. 5 describes the process of shifting a component data D0 of leaf tile1. Firstly, zero is filled before the component data, such that a vector data D1 reaches the number of full bandwidth bits, i.e., 256 bits; secondly, the bit number that the vector data shall be shifted to the left is calculated by a formula (id*preset bandwidth) according to the id number, i.e., number 1, and preset bandwidth bits, the bit number of the component data, i.e., 16 bits. In this example, the vector data is just required to shift 16 bits to the left. As can be seen, shifting allows that the original component D0 is located at data[31:16] of a full bandwidth data, i.e., a position of D2, and forms a vector data D3 to be transmitted at the end.

Figure 4:
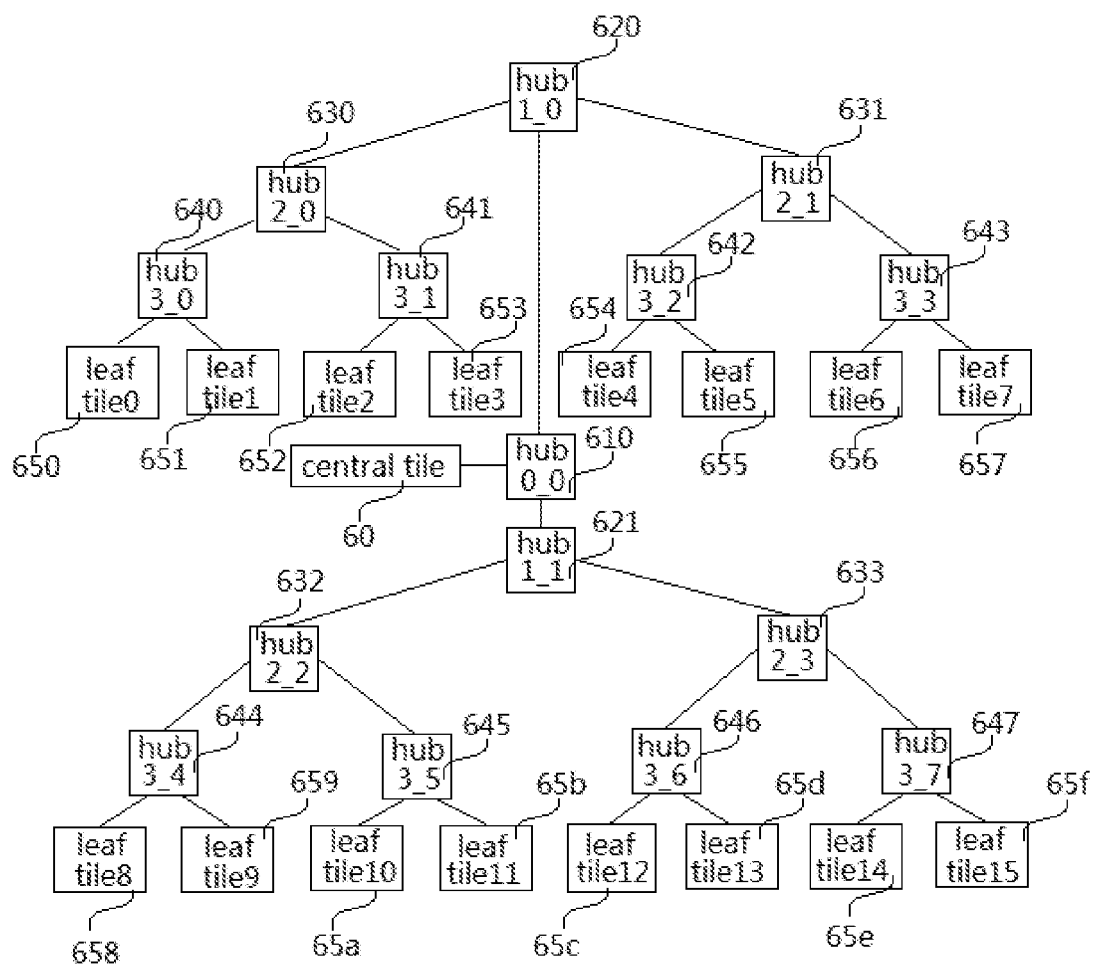
FIG. 4 is a schematic structure diagram of a topology of a complete binary tree expanded from the H-tree structure according to the present disclosure.
Figure 7:
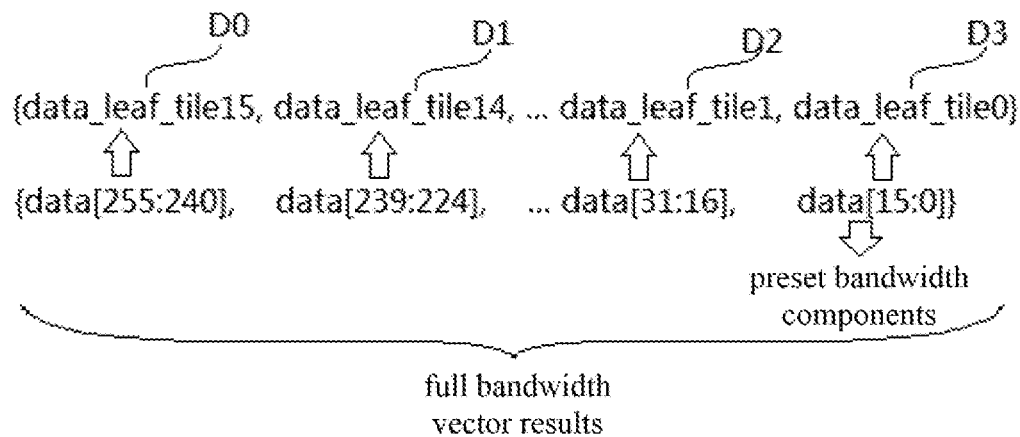
FIG. 7 is a schematic diagram of vector results when the component data of all leaf tiles are at an endpoint of a spliced data path in one embodiment of the present disclosure.

As shown in FIG. 4, it is an expansion of a complete binary tree of the H-tree shown in FIG. 1. An id identifier of each leaf tile corresponds to a queue number that sequentially increases from one side of a topology of the complete binary tree expanded from the H-tree according to an order, i.e., leaf tile0 corresponds to the number 0. As can be seen, the id identifier of each leaf tile is unique, ids of all leaf tiles are consecutive natural numbers, and in this example, they are natural numbers from 0 to 15. As can be speculated, the component data of preset bandwidth corresponding to the vector data of full bandwidth for each leaf tile are unique and non-conflicting, and all component data of the vector data of full bandwidth are consecutive. As shown in FIG. 7, the vector data represents the result that is obtained by splicing the component data in all leaf tiles whose effective bandwidth is a preset bandwidth in the above example. In this example, the component D0 in the vector data represents a component owned by a leaf tile15, and is located at data [255:240] of a full bandwidth data; the component D1 in the vector data represents a component owned by a leaf tile14, and is located at data[239:224] of the full bandwidth data. Positions of every two different leaf tiles on the vector data of full bandwidth are non-conflicting and consecutive, and are arranged according to the order. As can be known, the shifting way provides a technical support for non-conflicting and sequential returning the vector results on the H-tree structure.

Figure 6:
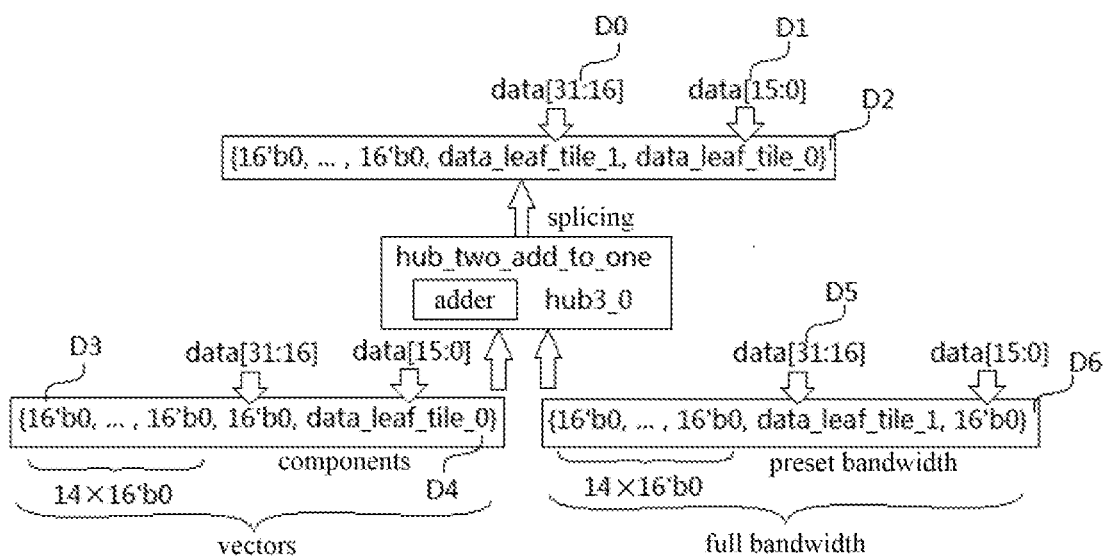
FIG. 6 is a schematic diagram of an action of splicing a component data in a hub in one embodiment of the present disclosure.

In the process of returning spliced vector data, in the above some examples, the hubs splice and transmit the vector data in the data cache. As shown in FIG. 6, it takes the hub3_0 in FIG. 1 for example. Firstly, the hub stores the vector data in a local cache. The number of adders in the hub is the number of the leaf nodes, i.e., in this example, there are total sixteen leaf nodes, so there are total sixteen adders. Each of the adders can have a preset bandwidth, which is set to be 16 bits in this example, and each of the adders has an overflow detection function. Two vector data D3 and D1 received from a group of leaf nodes leaf tile0 and leaf tile1 of the lower level are added and spliced. As can be seen, a component D4 of the leaf tile0 is located at data[31:16] of the component data D2 of full bandwidth after being spliced, i.e., a position of D0; a component D5 of the leaf tile1 is located at data[15:0] of the component data D2 of full bandwidth after being spliced, i.e., a position of D1. Accordingly, their component data are sequential, unique and non-conflicting on the vector result data. The vector data shown in FIG. 7 are vector data results which are finally obtained by processing hub0_0 under execution of the structure of FIG. 1 using this method. As can be seen, this method provides a technical support for non-conflicting and sequential returning the vector results.

As shown in FIG. 1, when the central tile labeled as 10 receives the vector data whose effective bandwidth is full bandwidth and which is transmitted from respective leaf tiles, a transmission way of the vector data on the hubs is as follows: firstly, each group of leaf tiles: the leaf tile0 labeled as 150 and the leaf tile1 labeled as 151, 152 and 153, 154 and 155, 156 and 157, 158 and 159, 15a and 15b, 15c and 15d, 15e and 15f perform Handshake Protocols respectively with the corresponding leaf hubs: the hub3_0 labeled as 140, 141, 142, 143, 144, 145, 146 and 147 of the upper level in directly connection with the leaves, and the vector data are input into data caches of the leaf hubs, and added; when the leaf hubs: the hub3_0 labeled as 140, 141, 142, 143, 144, 145, 146 and 147 successful perform handshake with the intermediate hubs: the hub2_0 labeled as 130, 131, 132 and 133 of the upper level respectively, the vector data are input into data caches of the intermediate hubs, and added; similarly, when the intermediate hubs: the hub2_0 labeled as 130, 131, 132 and 133 successfully perform handshake with the hubs: a hub1_0 labeled as 120 and 121 of the upper level respectively, the vector data are input into data caches of 120 and 121, and added; finally, based on the handshake, 120 and 121 input the vector data into a data cache of a central hub0_0 in directly connection with the central tile for addition, and a finally added result is output to the central tile 10 via output ports. As can be seen, an operation on the add tree is completed on a path returning the vector data in the leaf tiles to the central tiles, and to return the vector data on this network structure by performing the operation on the add tree is achieved by the means of this method.

Figure 8:
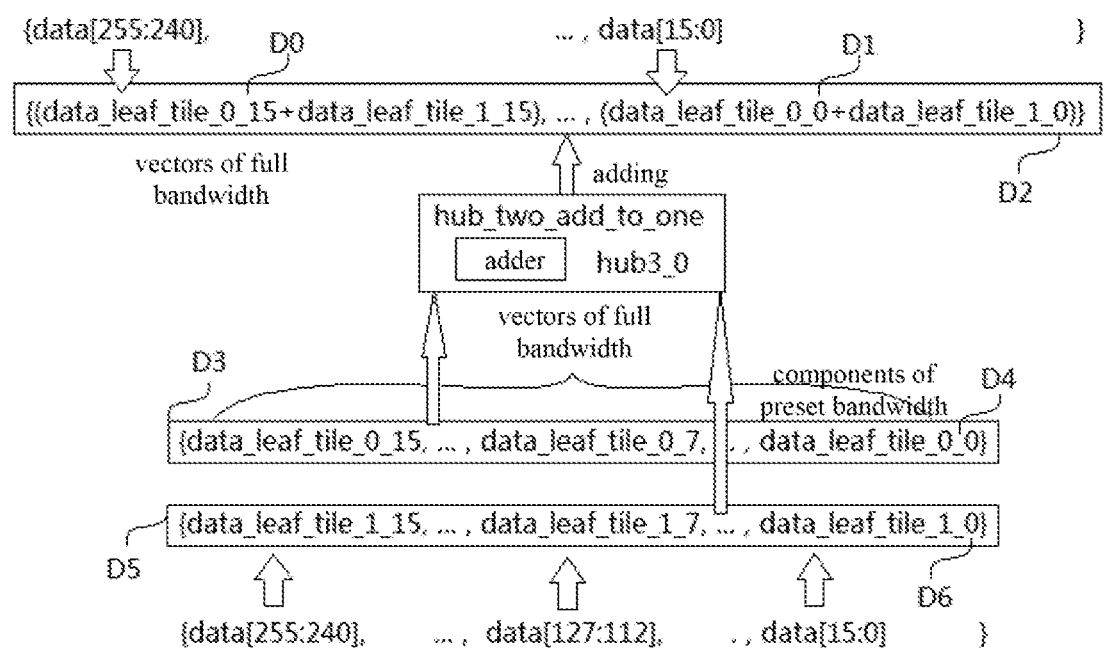
FIG. 8 is a schematic diagram of an action of adding the component data in hubs in one embodiment of the present disclosure.

In the process of returning the vector data of the add tree, in some examples, the hubs add and transmit the vector data in the data cache. As shown in FIG. 8, it takes the hub3_0 in FIG. 1 for example. Firstly, the hub stores the vector data in a local cache. The number of adders in the hub is the number of the leaf nodes, i.e., in this example, there are total sixteen leaf nodes, so there are total sixteen adders. Each of the adders can have a preset bandwidth, which is set to be 16 bits in this example, and each of the adders has an overflow detection function. The adders add sixteen components in two received vector data D3 and D5 transmitted from a group of leaf nodes leaf tile0 and leaf tile1 of the lower level separately. As can be seen, a low bit component D4 of D3 is located at full bandwidth data[15:0], and a low bit component D5 of D5 is located at full bandwidth data[15:0]. In a result added by the adders, a sum of the two items is written into a position of the component D0 of the result D2, i.e., data[15:0], after overflow detection and judgment. If the result of adding D4 and D6 is overflow, the adders will judge and estimate a value assignment according to an overflow result. Returning of the add tree vector data on the device is achieved by means of this method.

Another embodiment is a specific configuration of the vector data return processing unit in a X-tree network structure.

Figure 9:
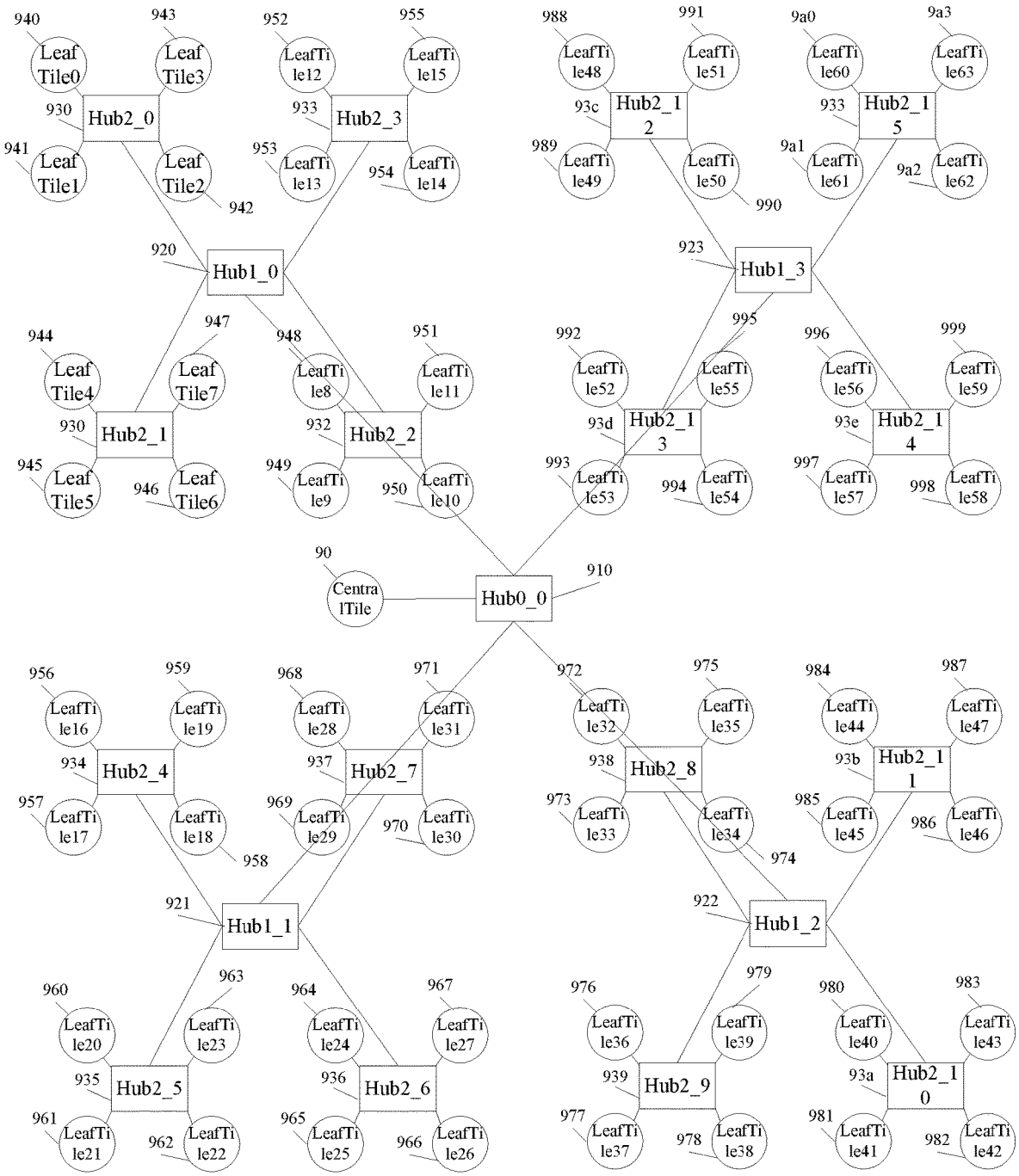
FIG. 9 is a schematic structure diagram of a multicore on chip of 16+1 cores connected s using a X-tree in another embodiment of the present disclosure.

FIG. 9 illustrates a schematic diagram of a communication device for processing and returning vector data elements on chip of 64+1 processing units connected using the X-tree network structure. A root node of the X-tree is a central tile, which is an endpoint of vector data transmission; leaf nodes of the X-tree are leaf tiles, which are start points of the vector data transmission; the remaining central nodes are hubs for processing and transmitting the vector data. Each leaf tile has a unique id identifier, which corresponds to a queue number that sequentially increases from one side of a topology of a complete quadtree expanded from the X-tree according to an order, i.e., leaf tile0 corresponds to the number 0. Therefore, the id identifier of each leaf tile can be ensured to be unique, ids of all leaf tiles are consecutive natural numbers, and in this example, they are natural numbers from 0 to 63. The component data of preset bandwidth corresponding to the vector data of full bandwidth for each leaf are unique and non-conflicting, and all component data of the vector data of full bandwidth are consecutive. A communication method of processing data elements by returning vector results in the X-tree is adopted in the device.

Figure 10:
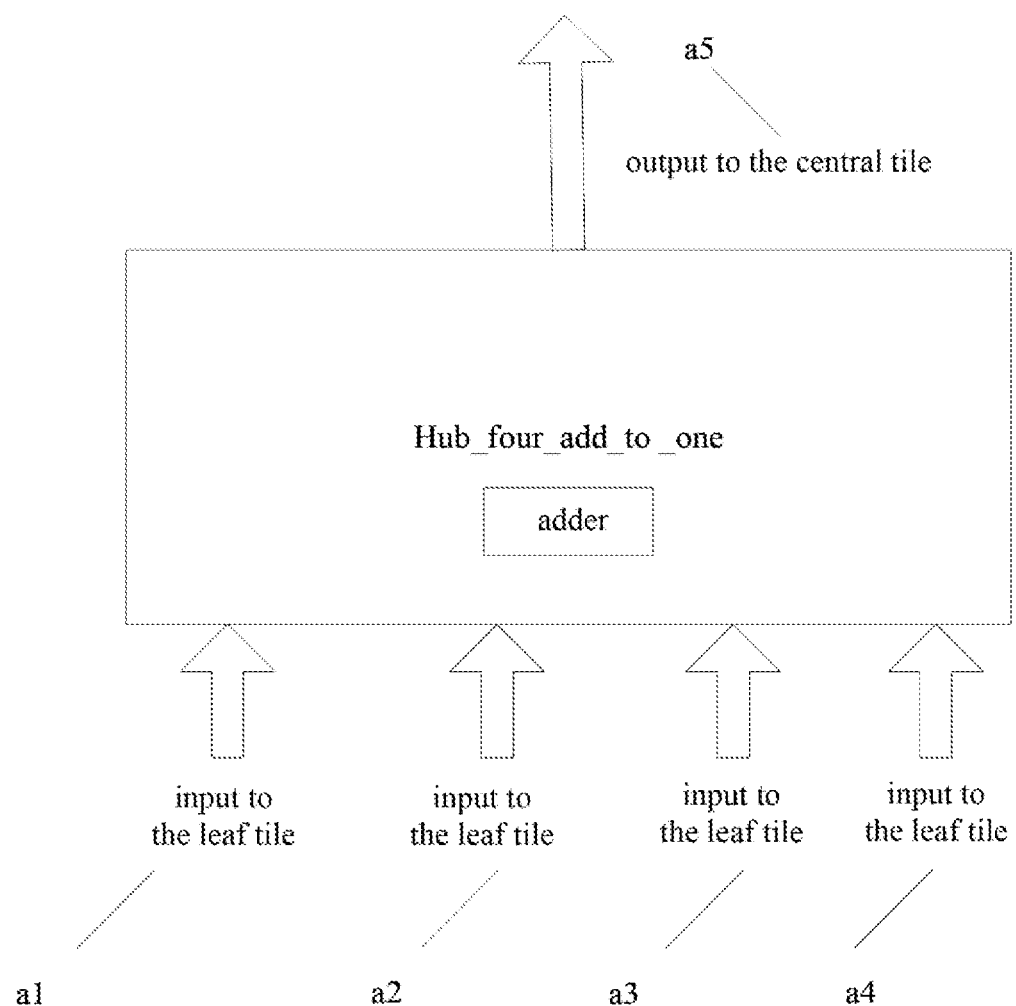
FIG. 10 is a schematic structure diagram of hub_four_add_to_one in another embodiment of the present disclosure.

FIG. 10 illustrates a schematic structure diagram of a hub in the X-tree network structure, the hub is consisted of a hub_four_add_to_one module which comprises an adder, the hub_four_add_to_one processes four groups of input vector data a1, a2, a3 and a4 of full bandwidth to one group of vector data a5 of full bandwidth to output and transmit from the leaf tiles to the central tile.

As shown in FIG. 9, when the central tile labeled as 90 collects the vector data whose effective bandwidth is a preset bandwidth and which is transmitted from respective leaf tiles, a transmission way of the vector data on the hubs is as follows: firstly, each group of leaf tiles: a leaf tile0 labeled as 940, a leaf tile1 labeled as 941, a leaf tile2 labeled as 942 and a leaf tile3 labeled as 943, 944, 945, 946 and 947, . . . , 9a0, 9a1, 9a2 and 9a3 perform Handshake Protocols respectively with the corresponding leaf hubs: a hub2_0 labeled as 930, 931, 932, 933, 934, 935, 936, 937, 938, 939, 93a, 93b, 93c, 93d, 93e and 93f of the upper level in directly connection with the leaves, and after the Handshakes are successful, the vector data are input into data caches of the leaf hubs, and spliced; when the leaf hubs: the hub2_0 labeled as 930, 931, 932, 933, 934, 935, 936, 937, 938, 939, 93a, 93b, 93c, 93d, 93e and 93f successfully perform handshake with the intermediate hubs: a hub1_0 labeled as 920, 921, 922 and 923 of the upper level respectively, the vector data are input into data caches of the intermediate hubs, and spliced; finally, based on the Handshake Protocols, the hub1_0 labeled as 920, 921, 922 and 923 input the vector data into a data cache of a central hub0_0 in directly connection with the central tile labeled as 910 for splicing, and a finally spliced result is output to the central tile labeled as 90 via output ports. Returning of the spliced vector data can be achieved on the network structure by means of this method.

Figure 11:
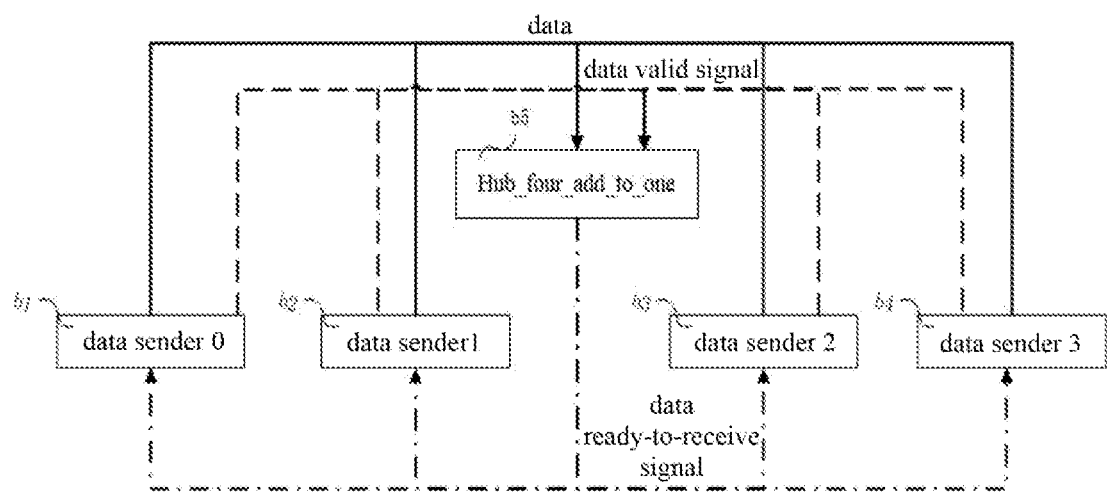
FIG. 11 is a schematic diagram of an action of handshake between the hub_four_add_to_one and the data senders in another embodiment of the present disclosure.

As shown in FIG. 11, when the hub_four_add_to_one module labeled as b5 has transmitted the data ready-to-receive signal to the bus, and the data sender 0 labeled as b1, the data sender 1 labeled as b2, the data sender 2 labeled as b3 and the data sender 3 labeled as b4 have transmitted the data and the data valid signal to the bus, the Handshake Protocol is successful, b1, b2, b3 and b4 consider that the data receiver b5 has received the data on this cycle, and b5 stores the data on the bus on this cycle into its buffer region on the next cycle. The data transmission protocol ensures data reliability in point-to-point data transmission, thereby ensuring reliability of data transmission of the network-on-chip.

Figure 12:
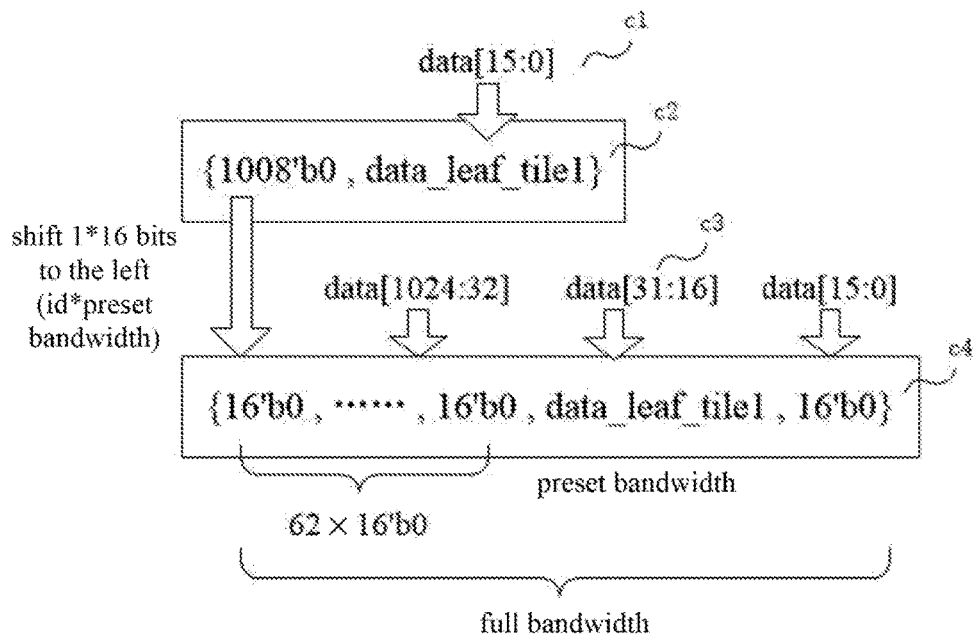
FIG. 12 is a schematic diagram of an action of shifting a component data to a vector data in a leaf tile in another embodiment of the present disclosure.

In the process of returning the spliced vector data, effective data bits transmitted by the leaf tiles are vector data of preset bandwidth, and before the leaf tiles transmit the vector data, the setting bits are selected to shift the component data owned by the leaf tiles. When selecting to shift the vector data, the leaf tiles calculate bits to be shifted according to the unique id number and the bit number of preset bandwidth, and shift the component data of preset bandwidth bits owned by the leaf tiles to the corresponding positions on the vector data of full bandwidth. As shown in FIG. 12, it is a specific example implemented on the X-tree of FIG. 9, supposing the full bandwidth is 1024 bits, and can be spliced by 16-bit component data owned by sixty-four leaf tiles. FIG. 12 describes the process of shifting a component data c1 of leaf tile1. Firstly, zero is filled before the component data, such that a vector data c2 reaches the bit number of full bandwidth, i.e., 1024 bits; secondly, the bit number that the vector data shall be shifted to the left is calculated by a formula (id*preset bandwidth) according to an id number, i.e., number 1, and preset bandwidth bits, the bit number of the component data, i.e., 16 bits. In this example, the vector data is just required to shift 16 bits to the left. As can be seen, shifting allows that the original component c1 is located at data[31:16] of a full bandwidth data, i.e., a position of c3, and forms a vector data c4 to be transmitted at the end.

Figure 14:
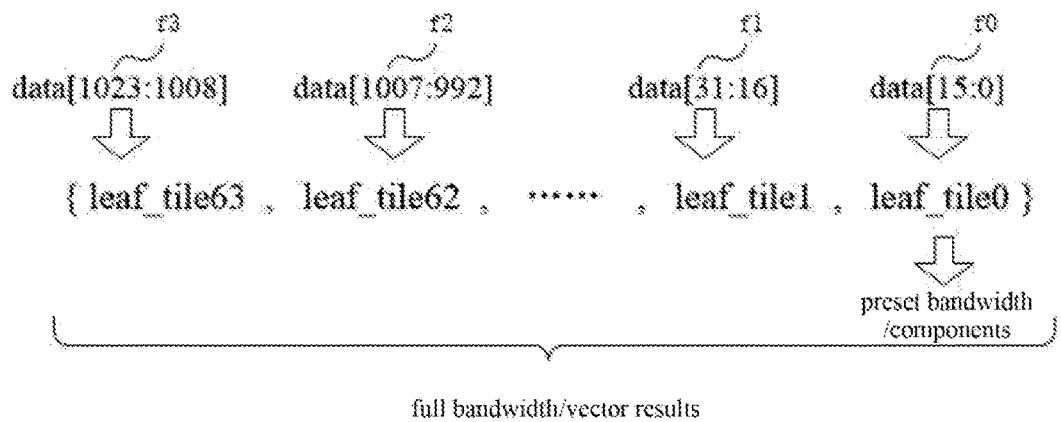
FIG. 14 is a schematic diagram of vector results when the component data of all leaf tiles are at an endpoint of a spliced data path in another embodiment of the present disclosure.

As shown in FIG. 14, the vector data represents the result that is obtained by splicing the component data in all leaf tiles whose effective bandwidth is a preset bandwidth in the above example. In this example, the component f3 in the vector data represents a component owned by a leaf tile 63, and is located at data[1024:1008] of a full bandwidth data; the component f2 in the vector data represents a component owned by a leaf tile 62, and is located at data[1007:992] of the full bandwidth data, and so on. As shown in the figure, the component f1 in the vector data represents a component owned by a leaf tile 1, and is located at data[31:16] of the full bandwidth data; the component f0 in the vector data represents a component owned by a leaf tile 0, and is located at data[15:0] of the full bandwidth data. Positions of every two different leaf tiles on the vector data of full bandwidth are non-conflicting and consecutive, and are arranged according to the order. As can be known, the shifting way provides a technical support for non-conflicting and sequential returning the vector results on the X-tree structure.

Figure 13:
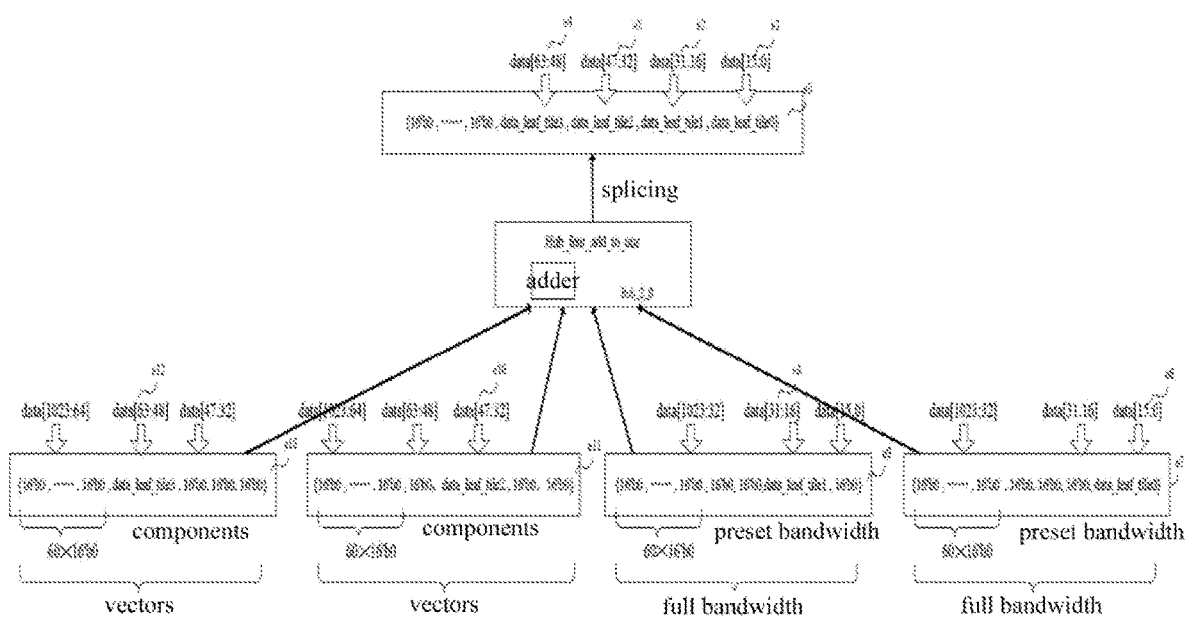
FIG. 13 is a schematic diagram of an action of splicing a component data in a hub in another embodiment of the present disclosure.

In the process of returning spliced vector data, in the above some examples, the hubs splice and transmit the vector data in the data cache. As shown in FIG. 13, it takes the hub2_0 in FIG. 9 for example. Firstly, the hub stores the vector data in a local cache. The number of adders in the hub is the number of the leaf nodes, i.e., in this example, there are total sixty-four leaf nodes, so there are total sixty-four adders. Each of the adders can have a preset bandwidth, which is set to be 16 bits in this example, and each of the adders has an overflow detection function. Four received vector data e7, e9, e11 and e13 transmitted from a group of leaf nodes leaf tile0, leaf tile1, leaf tile2 and leaf tile3 of the lower level are added and spliced. As can be seen, a component e6 of the leaf tile0 is located at data[15:0] of a full bandwidth component data e5 after being spliced, i.e., a position of e1; a component e8 of the leaf tile1 is located at data[31:16] of the full bandwidth component data e5 after being spliced, i.e., a position of e2; a component e10 of the leaf tile2 is located at data[47:32] of the full bandwidth component data e5 after being spliced, i.e., a position of e3; a component e8 of the leaf tile3 is located at data[63:48] of the full bandwidth component data e5 after being spliced, i.e., a position of e4. Accordingly, their component data are sequential, unique and non-conflicting on the vector result data. The vector data shown in FIG. 14 are final obtained vector data results by processing hub0_0 under execution of the structure of FIG. 9 using this method. As can be seen, this method provides a technical support for non-conflicting and sequential returning the vector results.

As shown in FIG. 9, when the central tile labeled as 90 receives the vector whose effective bandwidth is full bandwidth and which is transmitted from respective leaf tiles, a transmission way of the vector data on the hubs is as follows: firstly, each group of leaf tiles: the leaf tile0 labeled as 940, the leaf tile1 labeled as 941, the leaf tile2 labeled as 942 and the leaf tile3 labeled as 943, 944, 945, 946 and 947, . . . , 9a0, 9a1, 9a2 and 9a3 perform Handshake Protocols respectively with the corresponding leaf hubs: the hub2_0 labeled as 930, 931, 932, 933, 934, 935, 936, 937, 938, 939, 93a, 93b, 93c, 93d, 93e and 93f of the upper level in directly connection with the leaves, and the vector data are input into data caches of the leaf hubs, and added; when the leaf hubs: the hub2_0 labeled as 930, 931, 932, 933, 934, 935, 936, 937, 938, 939, 93a, 93b, 93c, 93d, 93e and 93f successfully perform handshake with the intermediate hubs: the hub1_0 labeled as 920, 921, 922 and 923 of the upper level, respectively, the vector data are input into data caches of the intermediate hubs, and added; finally, based on the handshake, the hub1_0 labeled as 920, 921, 922 and 923 input the vector data into a data cache of a central hub0_0 in directly connection with the central tile labeled as 910 for addition, and a finally added result is output to the central tile labeled as 90 via output ports. As can be seen, an operation on the add tree is completed on a path returning the vector data in the leaf tiles to the central tiles, and to return the vector data on the network structure by performing the operation on the adder tree is achieved by the means of this method.

Figure 15:
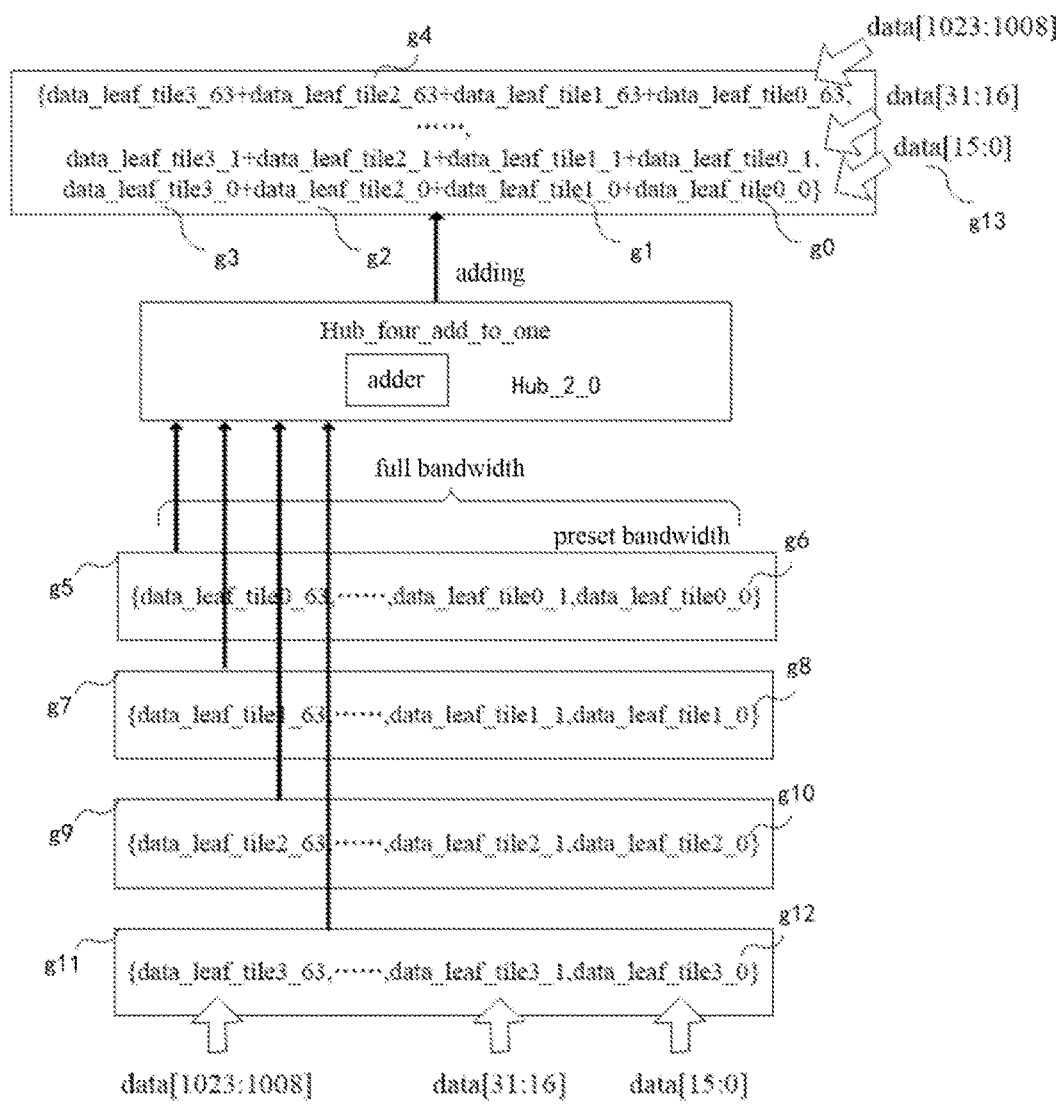
FIG. 15 is a schematic diagram of an action of adding the component data in hubs in another embodiment of the present disclosure.

In the process of returning the vector data of the add tree, in some examples, the hubs add and transmit the vector data in the data cache. As shown in FIG. 15, it takes the hub2_0 in FIG. 9 for example. Firstly, the hub stores the vector data in a local cache. The number of adders in the hub is the number of the leaf nodes, i.e., in this example, there are total sixty-four leaf nodes, so there are total sixty-four adders. Each of the adders can have a preset bandwidth, which is set to be 16 bits in this example, and each of the adders has an overflow detection function. The adders add sixteen components in four received vector data g5, g7, g9 and g11 transmitted from a group of leaf nodes leaf tile0, leaf tile1, leaf tile2 and leaf tile3 of the lower level separately. As can be seen, a low bit component g6 of g5 is located at full bandwidth data[15:0], a low bit component g8 of g7 is located at the full bandwidth data[15:0], a low bit component g10 of g9 is located at the full bandwidth data[15:0], and a low bit component g12 of g11 is located at the full bandwidth data[15:0]. In a result added by the adders, a sum of the four items is written into a position of the component g13 of the result g4, i.e., data[15:0], after overflow detection and judgment. If the result of adding g6, g8, g10 and g12 is overflow, the adders will judge and estimate a value assignment according to an overflow result. Returning of the add tree vector data on the device is achieved by means of this method.

The device and processing scale explained here are to simplify the present disclosure. Applications, modifications and variations of a process data element communication device and method for returning vector data in a fractal tree (taking the H-tree and X-tree for example) are obvious for those skilled in the art.

In conclusion, according to the present disclosure, since it provides a process data element communication device and method for returning vector data in a fractal tree, it achieves operations of splicing and adding vector data results of network-on-chip, and completes returning of the vector data in a non-conflicting, reliable and sequential way, such that communication is more convenient and efficient, and effect is better.

INDUSTRIAL APPLICABILITY

The present disclosure achieves operations of splicing and adding vector data results of network-on-chip, such that the vector results can be returned in a non-conflicting, reliable and sequential way, so as to obtain a better communication effect.

What is claimed is:

1. A device for a vector data returning processing unit in a fractal tree, comprising:
    a central node that is as a communication data center of a network-on-chip and for receiving the vector data returned by a plurality of leaf nodes;
    a plurality of leaf nodes for calculating and shifting the vector data; and
    forwarder modules configured to perform data communication between nodes of upper and lower levels and process the vector data, and the forwarder modules comprising a local cache structure and adders, the local cache structure is used to store vector data, and adders are used to overlay the vector data transmitted by the lower level nodes;
    wherein the plurality of leaf nodes comprises N groups, each group comprising one or more leaf nodes, and each group having the same number of leaf nodes, the central node is individually in communication with each group of leaf nodes by means of the forwarder modules, a communication structure constituted by each group of leaf nodes has self-similarity, the plurality of leaf nodes are in communication with the central node in a complete M-way tree approach by means of the forwarder modules of multiple levels, each leaf node comprises a setting bit, if the setting bit requires that the vector data in the leaf node be shifted, the leaf node shifts the vector data of preset bandwidth bits to a corresponding position, and otherwise, the leaf node returns the vector data to the central node;
    wherein both the central node and the leaf node are processing units.

2. The device for the vector data returning processing unit in the fractal tree according to claim 1, wherein each of the leaf nodes has an id identifier which sequentially increases in sequence numbers from one side of a topology of the complete M-way tree according to an order.

3. The device for the vector data returning processing unit in the fractal tree according to claim 1, wherein each of the forwarder modules comprises adders of preset bandwidth, the number of the adders is a total number of the leaf nodes, and the adders have overflow detection function, wherein if the vector data is shifted, the forwarder modules splice the received vector data, and transmit spliced results to nodes of the upper level, and otherwise, the forwarder modules transmit the received vector data to the nodes of the upper level after detecting overflow and performing an add operation.

4. A method of using a device for a vector data returning processing unit in a fractal tree, wherein the device for the vector data returning processing unit in the fractal tree comprises:
    a central node that is as a communication data center of a network-on-chip and for receiving the vector data returned by a plurality of leaf nodes;
    a plurality of leaf nodes for calculating and shifting the vector data; and
    forwarder modules configured to perform data communication between nodes of upper and lower levels and process the vector data, and the forwarder modules comprising a local cache structure and adders, the local cache structure is used to store vector data, and adders are used to overlay the vector data transmitted by the lower level nodes;
    wherein the plurality of leaf nodes comprises N groups, each group comprising one or more leaf nodes, and each group having the same number of leaf nodes, the central node is individually in communication with each group of leaf nodes by means of the forwarder modules, a communication structure constituted by each group of leaf nodes has self-similarity, the plurality of leaf nodes are in communication with the central node in a complete M-way tree approach by means of the forwarder modules of multiple levels, each leaf node comprises a setting bit, if the setting bit requires that the vector data in the leaf node be shifted, the leaf node shifts the vector data of preset bandwidth bits to a corresponding position, and otherwise, the leaf node returns the vector data to the central node;
    the method, comprising:
    calculating and shifting vector data by means of the leaf nodes, and returning to the central node, wherein each leaf node comprises a setting bit, if the setting bit requires that the vector data in the leaf nodes be shifted, the leaf node shifts the vector data of preset bandwidth bits to a corresponding position, and otherwise, the leaf node returns the vector data to the central node;
    wherein both the central node and the leaf node are processing units.

5. The method of using the device for the vector data returning processing unit in the fractal tree according to claim 4, wherein each of the leaf nodes has an id identifier which sequentially increases in sequence numbers from one side of a topology of the complete M-way tree according to an order.

6. The method of using the device for the vector data returning processing unit in the fractal tree according to claim 5, wherein if data transmitted by a leaf node is vector data of valid preset bandwidth, the setting bit requires that the leaf node to perform shifting, the leaf node performs calculation based on the id identifier and the bit number of preset bandwidth, so as to shift the vector in the leaf node to a corresponding position on full bandwidth.

7. The method of using the device for the vector data returning processing unit in the fractal tree according to claim 4, wherein if the vector data is shifted, the forwarder modules splice the received vector data, and transmit spliced results to nodes of an upper level, and otherwise, the forwarder modules transmit the received vector data to the nodes of the upper level after detecting overflow and performing an add operation.

8. The method of using the device for the vector data returning processing unit in the fractal tree according to claim 4, wherein a Handshake Protocol is abided between the leaf nodes and the central node.

9. A control device comprising a device of for a vector data returning processing unit in a fractal tree, wherein the device for the vector data returning processing unit in the fractal tree comprises:
   a central node that is as a communication data center of a network-on-chip and for receiving the vector data returned by a plurality of leaf nodes;
   a plurality of leaf nodes for calculating and shifting the vector data; and
   forwarder modules configured to perform data communication between nodes of upper and lower levels and process the vector data, and the forwarder modules comprising a local cache structure and adders, the local cache structure is used to store vector data, and adders are used to overlay the vector data transmitted by the lower level nodes;
   wherein the plurality of leaf nodes comprises N groups, each group comprising one or more leaf nodes, and each group having the same number of leaf nodes, the central node is individually in communication with each group of leaf nodes by means of the forwarder modules, a communication structure constituted by each group of leaf nodes has self-similarity, the plurality of leaf nodes are in communication with the central node in a complete M-way tree approach by means of the forwarder modules of multiple levels, each leaf node comprises a setting bit, if the setting bit requires that the vector data in the leaf node be shifted, the leaf node shifts the vector data of preset bandwidth bits to a corresponding position, and otherwise, the leaf node returns the vector data to the central node;
   wherein both the central node and the leaf node are processing units.

10. The control device comprising the device for the vector data returning processing unit in the fractal tree according to claim 9, wherein each of the leaf nodes has an id identifier which sequentially increases in sequence numbers from one side of a topology of the complete M-way tree according to an order.

11. The control device comprising the device for the vector data returning processing unit in the fractal tree according to claim 9, wherein each of the forwarder modules comprises adders of preset bandwidth, the number of the adders is a total number of the leaf nodes, and the adders have overflow detection function, wherein if the vector data is shifted, the forwarder modules splice the received vector data, and transmit spliced results to nodes of the upper level, and otherwise, the forwarder modules transmit the received vector data to the nodes of the upper level after detecting overflow and performing an add operation.

12. An intelligent chip comprising the control device, the control device comprising the device for a vector data returning processing unit in a fractal tree, wherein
   the device for a vector data returning processing unit in a fractal tree, comprising:
   a central node that is as a communication data center of a network-on-chip and for receiving the vector data returned by a plurality of leaf nodes;
   a plurality of leaf nodes for calculating and shifting the vector data; and
   forwarder modules configured to perform data communication between nodes of upper and lower levels and process the vector data, and the forwarder modules comprising a local cache structure and adders, the local cache structure is used to store vector data, and adders are used to overlay the vector data transmitted by the lower level nodes;
   wherein the plurality of leaf nodes comprises N groups, each group comprising one or more leaf nodes, and each group having the same number of leaf nodes, the central node is individually in communication with each group of leaf nodes by means of the forwarder modules, a communication structure constituted by each group of leaf nodes has self-similarity, the plurality of leaf nodes are in communication with the central node in a complete M-way tree approach by means of the forwarder modules of multiple levels, each leaf node comprises a setting bit, if the setting bit requires that the vector data in the leaf node be shifted, the leaf node shifts the vector data of preset bandwidth bits to a corresponding position, and otherwise, the leaf node returns the vector data to the central node;
   wherein both the central node and the leaf node are processing units.

13. The intelligent chip comprising the control device according to claim 12, wherein each of the leaf nodes has an id identifier which sequentially increases in sequence numbers from one side of a topology of the complete M-way tree according to an order.

14. The intelligent chip comprising the control device according to claim 12, wherein each of the forwarder modules comprises adders of preset bandwidth, the number of the adders is a total number of the leaf nodes, and the adders have overflow detection function, wherein if the vector data is shifted, the forwarder modules splice the received vector data, and transmit spliced results to nodes of the upper level, and otherwise, the forwarder modules transmit the received vector data to the nodes of the upper level after detecting overflow and performing an add operation.

* * * * *